United States Patent [19]

Takubo et al.

[11] 3,887,774

[45] June 3, 1975

[54] TRANSISTOR SWITCHING CIRCUIT FOR USE IN A TELEPHONE SYSTEM

[75] Inventors: Hachiroh Takubo; Kengo Sudoh, both of Kawasaki, Japan; Stephen Kerman, Merrick, N.Y.

[73] Assignees: Nippon Tsu Shin Kogyo K.K., Kanagawa, Japan; TIE/Communications, Inc., Stamford, Conn.

[22] Filed: Mar. 14, 1973

[21] Appl. No.: 341,201

[52] U.S. Cl. .............................. 179/99; 179/18 AB
[51] Int. Cl. .............................. H04m 3/22
[58] Field of Search ...... 179/99, 1 H, 1 SW, 18 AB, 179/18 AD, 37, 18 F, 18 FA

[56] References Cited

UNITED STATES PATENTS

| | | | |
|---|---|---|---|
| 3,293,370 | 12/1966 | MacLeod | 179/18 AB |
| 3,535,461 | 10/1970 | Hugyecz | 179/18 AB |
| 3,691,310 | 9/1972 | Fenton | 179/18 AD |
| 3,766,325 | 10/1973 | Hatield | 179/99 |

*Primary Examiner*—Kathleen H. Claffy
*Assistant Examiner*—Gerald L. Brigance
*Attorney, Agent, or Firm*—Kenyon & Kenyon Reilly Carr & Chapin

[57] ABSTRACT

A D.C. transistor switching circuit is disclosed in which the switching characteristics of the circuit permit two independent signals to be transmitted, in opposite directions to each other over a single conductor, to control two different independent functions between two locations. The switching circuit, comprised of a diode and two transistors connected in opposition to each other, is used in the preferred embodiment in an intercom signalling circuit of a key telephone system to operate a call relay at a called key telephone in response to a signal from a key service unit and, independently of this signal and relay operation, to transmit a busy signal over the same conductor from the key telephone to a lamp on a busy indication lamp field, in order to indicate by illuminating the lamp when the key telephone is busy.

5 Claims, 1 Drawing Figure

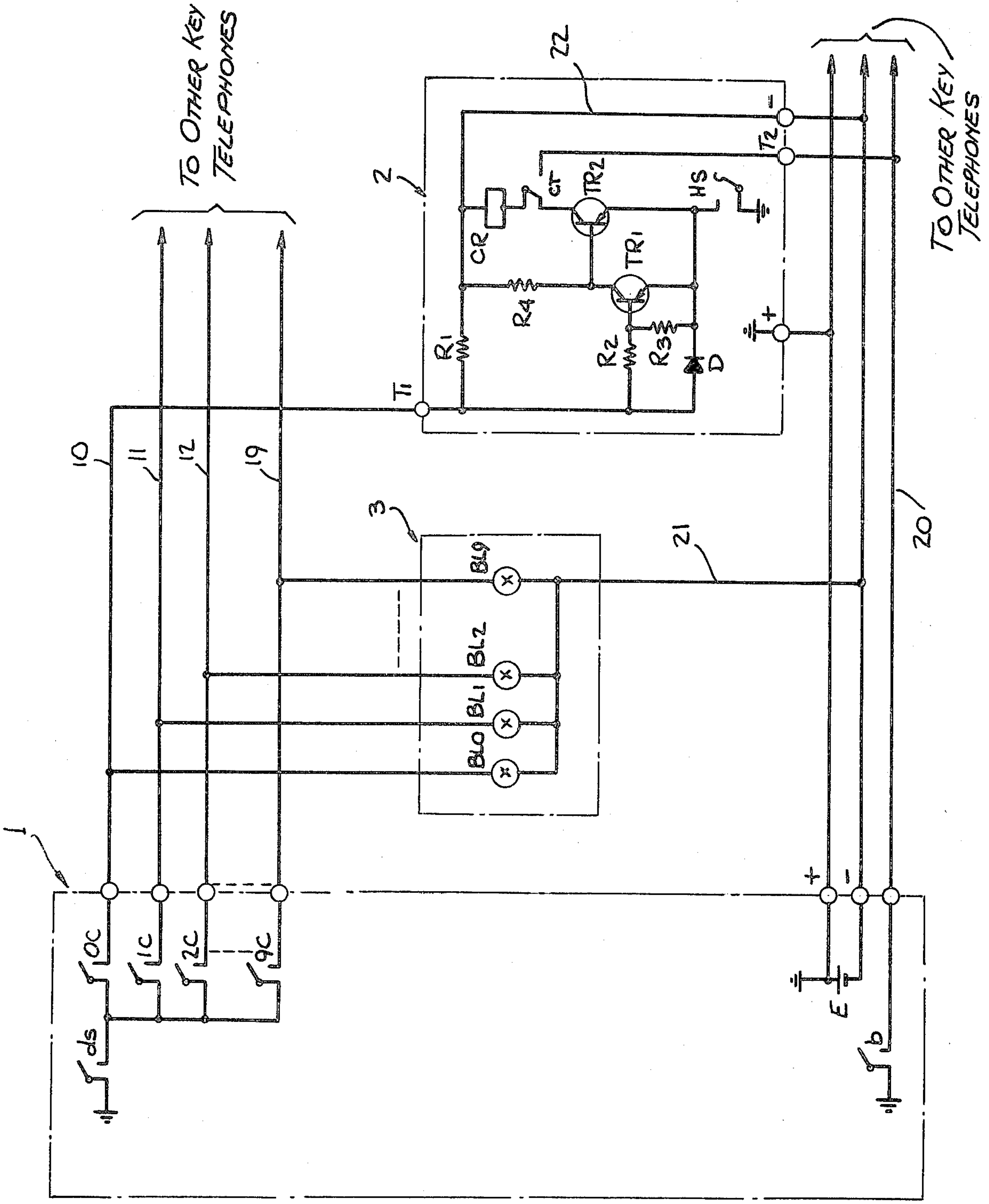
TO OTHER KEY TELEPHONES
TO OTHER KEY TELEPHONES
22
2
3
1
10
11
12
19
20
21
T1
T2
CR
CT
TR1
TR2
HS
R1
R2
R3
R4
D
BL0
BL1
BL2
BL9
0C
1C
2C
9C
ds
E
b

TRANSISTOR SWITCHING CIRCUIT FOR USE IN A TELEPHONE SYSTEM

BACKGROUND OF THE INVENTION

The present invention relates, in general, to a switching circuit and, more particularly, to a D.C. transistor switching circuit for use in an intercom signalling circuit of a key telephone system.

In a telephone system it is frequently required to perform two functions or operations at separate locations and to perform the functions independently of each other. For example, in the intercom signalling circuit of a key telephone system, it is desirable to call the telephone regardless of whether or not the telephone is busy, and to operate a busy indication lamp at a location remote from the telephone whenever the telephone is being used. One method for accomplishing this is to interconnect the two locations by multiple conductors, which transmit unidirectional signals to perform each function at each location. while this satisfies the operational requirements, the necessity to use multiple conductors is inefficient, requiring the use of multiple conductors, using conductors in the cable which may be required for other functions and generally increasing installation costs.

Thus it is an object of the present invention to overcome these problems and difficulties by using a single conductor to transmit a signal in one direction to perform a function at one location and, using the same conductor, send another signal from that location, in the opposite direction to, and independent of, the first signal, to a second location, where a second function is performed in response to the second signal.

A further object of this invention is to transmit and receive the two signals either simultaneously with, or subsequent to, each other, without interference between the transmission and reception of the two signals, or the performance of the two functions resulting from the signals.

These, and other objects, are achieved in one preferred embodiment of the invention, in which a transistor switching circuit is installed in an intercom signalling circuit of a key telephone system. In this system, a single conductor is used to transmit an intercom call signal from a first signalling means such as a key service unit to a key telephone set, operate the first responsive means such as an intercom call relay at the called set, thereby permitting the communication of a message to the called set, while permitting a second signal such as a busy signal to be sent back over the same conductor, independent of the first signal, to a remote location where a second responsive means such as a busy lamp is illuminated to indicate when the called set is in use. Both the call signal and the busy signal may be sent simultaneously with and independent of each other, and both the call function and the busy function may be performed simultaneously with and independent of each other. Specifically, a D.C. transistor switching circuit comprising a diode and two transistors connected in opposition to one another, is used to control the operation of an intercom call relay at the set, in response to a call signal received at the set over a single intercom conductor connected to a key service unit, the signal being sent from the key service unit in response to the telephone set originating the call. The switching circuit permits the intercom call relay to operate irrespective of whether or not the intercom conductor is being used to transmit a signal from the called key telephone set to a busy indicator lamp to indicate that the called key telephone set is in use. Conversely the switching circuit permits the intercom conductor to be used to transmit a busy indication signal to a busy lamp without falsely operating the call relay.

BRIEF DESCRIPTION OF THE DRAWING

The invention, as well as its objects and features, will be better understood by reference to the following detailed description of the preferred embodiment of this invention taken in conjunction with the accompanying drawing which is a schematic circuit diagram of an intercom signalling circuit of a key telephone set.

DESCRIPTION OF THE PREFERRED EMBODIMENT

As shown in the drawing, a key service unit signalling circuit means 1 and key telephone set 2 are only illustrated in the parts essential to an understanding of the present invention. In the drawing a busy indication lamp field 3 is furnished remotely from the key telephone set and has one busy indication lamp for each of the key telephone sets connected to the system.

Within the key service unit 1, 0C to 9C are contacts on relays 0C to 9C of the counting circuit, part of a signalling circuit, (not shown in the drawing) for each of the key telephones connected to the key service unit 1 by lines 10, 11, 12 through 19. One of relays 0C to 9C are operated in response to the intercom directory number dialled at a key telephone set when an intercom call is originated. Relay B in the counting circuit (not shown) has a contact b which is operated at the beginning of an intercom call by the signalling circuits of the key service unit, in response to the originating station, and relay B remains operated until the intercom signalling operation is completed. The contact, *b*, on relay B, is connected from ground through conductor 20 to a contact of the CR relay in key telephone set 2 and a similar contact on each key telephone set in the system. It is a holding circuit, the operation of which will be explained infra.

The contact ds is on relay DS of the counting circuit (not shown) and is connected between ground and the contacts 0C, 1C, 2C through 9C. Relay DS operates simultaneously with the operation of one of the relays 0C to 9C, remaining operated only for the time required to operate relay CR in key telephone set 2, after which it is released.

A. To explain the various functions and conditions of operation in the switching circuit of this invention, the sequence of transmitting and receiving signals among key service unit or first signalling means 1, key telephone set 2 and busy indication lamp field 3 will be outlined. The example considered will be for a key telephone set having an intercom directory number 0. When this key telephone set is called on the intercom signalling circuit by the caller dialing the number 0 at his key telephone set, a counter circuit in the key service unit 1 operates, contacts *b*, 0C, and *ds* in the key service unit 1 close. Ground is thereby extended from *ds*, through closed contact 0C and the lead 10, to terminal T1 of key telephone set 2. This ground thereby appears at the emitters of transistors TR1 and TR2 through diode D and simultaneously through resistor R2 at the base of transistor TR1. Since the base-emitter junction of transistor TR1 is not forward biased under these conditions, no collector current flows in TR1. Transistor TR2 has a base current flow through resistor R4, and via the negative lead 22 to power source E in the key service unit, causing current flow in TR2 from the emitter to the collector of TR2. The collector current in transistor TR2 flows through relay CR to the lead 22, connected to the negative terminal of a power source E. Consequently, the first responsive means, relay CR, operates, and is held operated by the hold ground sent via lead 20 from the key service unit 1, through its make-before-break contact *cr*.

When the above mentioned ground is placed on the lead 10, busy indication lamp BLO mounted on the busy lamp field is simultaneously grounded and lights. The grounding of this lamp occurs, however, only during the time interval required to operate relay CR as described above. Since relay CR is held by the ground connected through lead 20, the ds contact is closed only long enough to operate relay CR. BLO is falsely illuminated therefore only for this short period, which is too short to interfere with the busy indication function.

Thus by the operation of this circuit a signal can be sent from the first signalling circuit means key service unit 1 over the single conductor 10 to the switching means 2 operating the first responsive means, relay CR. The operation of relay CR completes a signalling circuit (not shown in the drawing) by means of its other contacts, thereby alerting the called party to the incoming call at his telephone set.

B. In the event the key telephone set operates its hookswitch, the second signalling means, while the CR relay is not operated, contact HS is closed. A circuit is thereby established from ground, through contact HS, through the emitter-base junction of transistor TR1 through resistor R2, over lead 10 through lamp BLO, overlead 21 to power source E. TR1 is saturated and lamp BLO lights to indicate that key telephone set 0 has its switch hook operated (that is, it is busy). Simultaneously, ground appears at the emitter of transistor TR2 from hookswitch HS, but the current to lamp BLO flowing through the emitter-base of transistor TR1, causes saturated collector current flow in transistor TR1 through resistor R4 and lead 22 to battery E. Consequently, the emitter-base forward bias of transistor TR2, shorted by saturated transistor TR1, is insufficient to turn on transistor TR2. Therefore, transistor TR2 does not conduct and relay CR does not operate. By the operation of the transistors TR1 and TR2 in the key telephone set 2, a busy or second signal is transmitted over line 10 to the second responsive means, busy indication lamp field 3, illuminating lamp BLO while not operating relay CR of the intercom signalling circuit.

Normally, when hookswitch HS closes, the base-emitter current flow through TR1 flows through BLO as described above. Resistor R1 is provided, however, to prevent the false operation of relay CR if the busy lamp circuit should inadvertently be opened and the hookswitch HS raised. Without this resistor, ground applied to the emitters of TR1 and TR2 by HS would not cause base current of transistor TR1 to flow, not causing transistor TR1 to conduct, and consequently, the base-emitter current of transistor TR2 would flow, through R4, lead 22 to source E, causing relay CR to operate.

C. In the event a key telephone set is called while its hookswitch is raised, the busy indication lamp is already illuminated as described above and transistor TR1 is already in a conducting state, forcing transistor TR 2 into a nonconducting state. At this moment, if the key telephone set is called by another key telephone set, a ground appears at the appropriate counting output lead, in this example, lead 10 of key service unit 1. Current flows from ground through lead 10, through the busy lamp indicator BLO and over lead 10 through R1 in the called key telephone set, through lead 22 to the battery E. Consequently, the base of transistor TR1 is grounded cutting off transistor TR1. When transistor TR1 is cut off, the base current of transistor TR2 flows through resistance R4, transistor TR2 conducts and relay CR operates. Thus, even if the called key telephone set has its hookswitch closed, and the intercom signalling conductor is being used to light the busy indication lamp, the intercom signalling operation is performed without hindrance.

By the present invention as explained in detail in the example above, it is possible to exercise simultaneous independent control over two independent functions (in the present example, an intercom call signal and the lighting of a busy indication lamp) in opposite directions using a single conductor.

It is to be understood that the embodiment of this invention described herein is merely intended to illustrate the operative principles of the invention and is not to be considered as limiting the scope of the invention. Modifications may be made by those skilled in the art without departing from the spirit of the invention.

What is claimed is:

1. A switching circuit comprising a semiconductor switching circuit means having a first input terminal, a second input terminal and an output terminal, a first signalling means for producing a first signal output, said output connected by a single conductor to the first input terminal of the semiconductor switching means, a second signalling means for producing a second signal output, said output connected to the second input of the semiconductor switching means, and a first responsive means connected to the output terminal of the switching means and a second responsive means connected to the single conductor of said first signalling means, the semiconductor switching circuit means producing a first output signal at its output terminal for operating the first responsive means, said first switching output signal being produced in response to the first output signal from the first signalling means, independent of the signal from said second signalling means, and the switching means also producing a second output signal at its first input terminal in response to the second output signal from the second signalling means, for operating the second responsive means.

2. A switching circuit as in claim 1 wherein the semiconductor switching circuit is a transistor switching circuit.

3. A switching circuit as in claim 1 wherein the switching circuit is used in an intercom signalling circuit of a key telephone system, the semiconductor switching means is connected to a key telephone, the first signalling means is a key service unit having an output signal for signalling the key telephone, the output of the key service unit is connected to the key telephone by a single conductor intercom line, the second signalling means is a hookswitch, the first responsive means is a call relay means used to signal an incoming call at a key telephone from the key service unit, and the second responsive means is a busy indication lamp in a busy indication lamp field indicating when the key telephone hookswitch is closed.

4. A switching circuit as in claim 3 wherein the semi-conductor switching circuit is comprised of a diode and two transistors connected in opposition to each other, in which the first input terminal is connected through the forward biased diode to the emitters of the transistors, the second input terminal is connected directly to the emitters of the transistors, the call relay means is connected to the collector circuit of the second transistor, the second transistor has its base connected to the collector of the second transistor and the collector and base of the first transistor are connected through resistors to a power source for operating the call relay, whereby the signal from the key service unit operates the call relay independent of the position of the hookswitch and the hookswitch operates the busy indication lamp independent of the operation of the call relay.

5. A switching circuit as in claim 1 further comprising:

a second semi-conductor switching means at the other end of a single conductor said second semi-conductor responding to the output of said first semi-conductor switching means to operate a second circuit in response to said first semiconductor means.

* * * * *